United States Patent
Prigent et al.

(10) Patent No.: US 7,701,873 B2
(45) Date of Patent: Apr. 20, 2010

(54) METHOD FOR THE DISCOVERY OF DEVICES CONNECTED TO AN IP NETWORK AND DEVICE TO CARRY OUT SAID METHOD

(75) Inventors: Nicolas Prigent, Rennes (FR); Olivier Heen, Domloup (FR); Yan-Mei Tang-Talpin, St-Gregoire (FR); Charles Salmon-Legagneur, Rennes (FR); Yves Maetz, Melesse (FR)

(73) Assignee: Thomson Licensing, Boulogne-Billancourt (FR)

( * ) Notice: Subject to any disclaimer, the term of this patent is extended or adjusted under 35 U.S.C. 154(b) by 592 days.

(21) Appl. No.: 11/093,413

(22) Filed: Mar. 30, 2005

(65) Prior Publication Data

US 2005/0220007 A1 Oct. 6, 2005

(30) Foreign Application Priority Data

Mar. 30, 2004 (FR) .................................. 04 03339

(51) Int. Cl.
H04L 12/28 (2006.01)
(52) U.S. Cl. ....................................... 370/254; 709/220
(58) Field of Classification Search ................. 370/252, 370/253, 254–255; 709/220–224
See application file for complete search history.

(56) References Cited

U.S. PATENT DOCUMENTS 6,842,460 B1 * 1/2005 Olkkonen et al. ........... 370/338
2003/0179742 A1 * 9/2003 Ogier et al. ................. 370/351
2003/0202479 A1 * 10/2003 Huang et al. ................ 370/252
2004/0022223 A1 * 2/2004 Billhartz ..................... 370/338
2004/0082312 A1 * 4/2004 O'Neill et al. .............. 455/405

FOREIGN PATENT DOCUMENTS

CN 1466064 A 1/2004
WO 02/39282 A1 5/2002

OTHER PUBLICATIONS

Guttman E.: "Service Location Protocol: Automatic Discovery of IP Network Services" IEEE Internet Computing, IEEE Service Center, Piscataway, New Jersey U.S. vol. 3, No. 4 pd Jan. 7, 1999 p. 71-80.

* cited by examiner

*Primary Examiner*—Ricky Ngo
*Assistant Examiner*—Pao Sinkantarakorn
(74) *Attorney, Agent, or Firm*—Robert D. Shedd; Harvey D. Shedd; Joel M. Fogelson

(57) ABSTRACT

The present invention relates to IP networks and, more particularly, local area networks, for example home networks. It concerns the manner in which devices connected to such networks obtain and update knowledge of the other compatible devices connected to the network. To do this, the invention is based on a finite-state machine, comprising connected, disconnected and standby states. The changes of state take place on receipt of messages, requests or replies from the other devices, or on expiry of timers in the absence of receipt of messages.

11 Claims, 2 Drawing Sheets

METHOD FOR THE DISCOVERY OF DEVICES CONNECTED TO AN IP NETWORK AND DEVICE TO CARRY OUT SAID METHOD

This application claims the benefit, under 35 U.S.C. 119, of French patent application No. 0403339 filed 30 Mar. 2004.

BACKGROUND

The present invention relates to IP ("Internet Protocol") networks, described in RFC791, and in particular local area networks, for example home networks. It concerns the manner in which devices connected to such networks obtain and update knowledge of the other compatible devices connected to the network.

In home networks using IEEE 1394 technology, a high-performance bus described in the document entitled "IEEE Std 1394-1995 High Performance Bus, Aug. 30, 1996", the connection or disconnection of a device in the network causes the reset of the bus, thereby initiating a connected device discovery phase.

In an IP network, the connection or disconnection of a device does not instigate any specific activity on the network which is likely to be detected by the other devices. Certain applications or certain protocols need a device connected to a network to be able to identify the other devices participating in this application or implementing the same protocol. We can cite, for example, the SmartRight digital content copy protection protocol, which is described, for example, in the European patent application published under number EP 1 253 762 A1. Devices implementing this protocol must detect the arrival of a new device compatible with this protocol on the network in such a way as to be able to initiate a key management phase to ensure network coherence.

Service discovery protocols exist on the IP network, for example the "Simple Services Discovery Protocol", described in the document entitled "draft-cai-ssdp-v1-03.txt", which is available from the IETF ("Engineering Internet Task Force"). However, this protocol, apart from the fact that it is geared towards the discovery of services, and in particular HTTP services, rather than devices, does not guarantee fast and reliable detection of the arrival of a device on the network. In fact, this detection is based on the dispatch of an announcement message by the device arriving on the network, this message being sent using the "User Datagram Protocol" (UDP), which is described in RFC768. This announcement message may never be received by the network devices, since the UDP protocol is not resilient and offers no guarantee against possible message loss. Moreover, this protocol is generally based on an event indicating connection, this event being generated by the "Medium Access Control" (MAC) layer.

Other protocols, such as the "Dynamic Host Configuration Protocol", enable a device arriving on the network to obtain information on the network. However, apart from the fact that, once connected, these protocols do not offer the means to be alerted of the subsequent connection of new devices, these protocols perform a conventional IP client-server function which is not relevant here. Indeed, for our application it is desirable for no device to play a specific role which excludes the use of a server which centralizes network management.

This therefore creates the problem of finding an IP-based method which is independent of the underlying network layers and which enables detection of the arrival on the network and the departure from the network of devices implementing the same method. This method cannot be based on the presence of a server performing a network management role in such a way as to be capable of functioning between all the devices carrying out the method without preliminary simple and immediate configuration.

SUMMARY OF THE INVENTION

An embodiment of the invention enables devices to carry out a method to quickly discover their own connection to the network and, once connected, the arrival of a new compatible device on the network. Another embodiment of the invention enables a list of compatible connected devices to be maintained, and the departure of compatible devices from the network to be discovered.

An embodiment of the invention relates to a method for discovery, by a device which is intended to be connected to an IP network, of devices implementing said method and connected to said network. This embodiment comprises a stage in which, the device being considered in a disconnected state, it sends requests in a repeated and automatic manner on the IP network. The invention also comprises a stage involving switchover to a connected state on receipt by the device of at least one message according to the method from a different device.

According to a particular embodiment of the invention, on receipt of a request originating from a different device, the device sends a reply on the network.

According to a particular embodiment of the invention, the device, being in a connected state, and not receiving a message according to the method for a first given period of time, sends a request on the IP network and switches to a message reception standby state.

According to a particular embodiment of the invention, the device, being in a message reception standby state and not receiving a message according to the method for a second given period of time, switches to the disconnected state.

According to a particular embodiment of the invention, the device, being in a message reception standby state and receiving a message according to the method, switches to the connected state.

According to a particular embodiment of the invention, the device sends messages according to the method in multicast mode to an address and a known port, whereby the device listens for this address and on this port.

According to a particular embodiment of the invention, the device, being in the message reception standby state and not receiving any messages according to the method, repeats a given number of times the dispatch of the request and the message reception standby for the second given period of time before switching to the disconnected state.

According to a particular embodiment of the invention, the requests sent when the device is in the disconnected state, referred to as first requests, are different from the requests sent when the device is in the connected state and when the first reply sent after having switched from the disconnected state is different from the following replies.

According to a particular embodiment of the invention, the device signals the arrival of a new device on the network on receiving a first request or a first reply.

According to a particular embodiment of the invention, the device maintains a list of connected devices.

According to a particular embodiment of the invention, the device compares the replies received in response to a request with the list of devices in order to remove the devices which have not replied from this list.

According to a particular embodiment of the invention, a device intended to be connected to an LP network which has means for transmitting request and means for transmitting replies on the IP network, means for activating timers characterized in that it has means for switching between a disconnected state, a connected state and a standby state depending on the receipt of a request or a reply from a different device, or on the expiry of timers.

The invention will be more readily understood and other features and advantages will become evident from reading the description which follows, referring also to the attached drawings, in which:

DETAILED DESCRIPTION OF THE INVENTION

The invention is based on the principle of a finite-state machine which enables the device to know whether it is connected, disconnected or on standby awaiting replies. The changes in state take place on receipt of messages from the other devices or on expiry of timers.

A device starting up switches to the disconnected state then sends a request on the network, asking any other compatible devices to reply. It then awaits a reply. If no reply is received within a given time, it repeats the request, while remaining in the disconnected state.

If it receives a reply indicating the presence of a device on the network, it switches to the connected state and begins to monitor the network. The receipt of a message, request or reply indicating the presence of a device confirms to it its connected device state. On receiving a request, it also sends a reply itself.

If it receives no message during a given period of time, it can switch to a message reception standby state. This state indicates that the device no longer knows whether it is still connected to the network. It then attempts to find this out. In order to do this, it sends a request on the network, asking all the devices present to reply. If it receives no reply, possibly after having renewed its request, it switches to the disconnected state, in which it sends periodic requests in order to detect a new connection to the network.

On receiving a message in the standby state; the device again switches to the connected state.

Use of this standby state is helpful in preventing the interpretation of a temporary loss of receipt of messages as a disconnection. This can be particularly useful if the network is a wireless network, in which short-term interference to radio reception can cause temporary interruptions in the network without actual loss of connection.

New devices can be detected, for example, by differentiating requests according to whether they are a first request after connection or a subsequent request. Similarly, the replies sent by a device on receipt of a request will be differentiated according to whether they are a first reply following connection or a subsequent reply. In this way, any device receiving a first request or a first reply will know that a new device has connected to the network.

Figure 1:
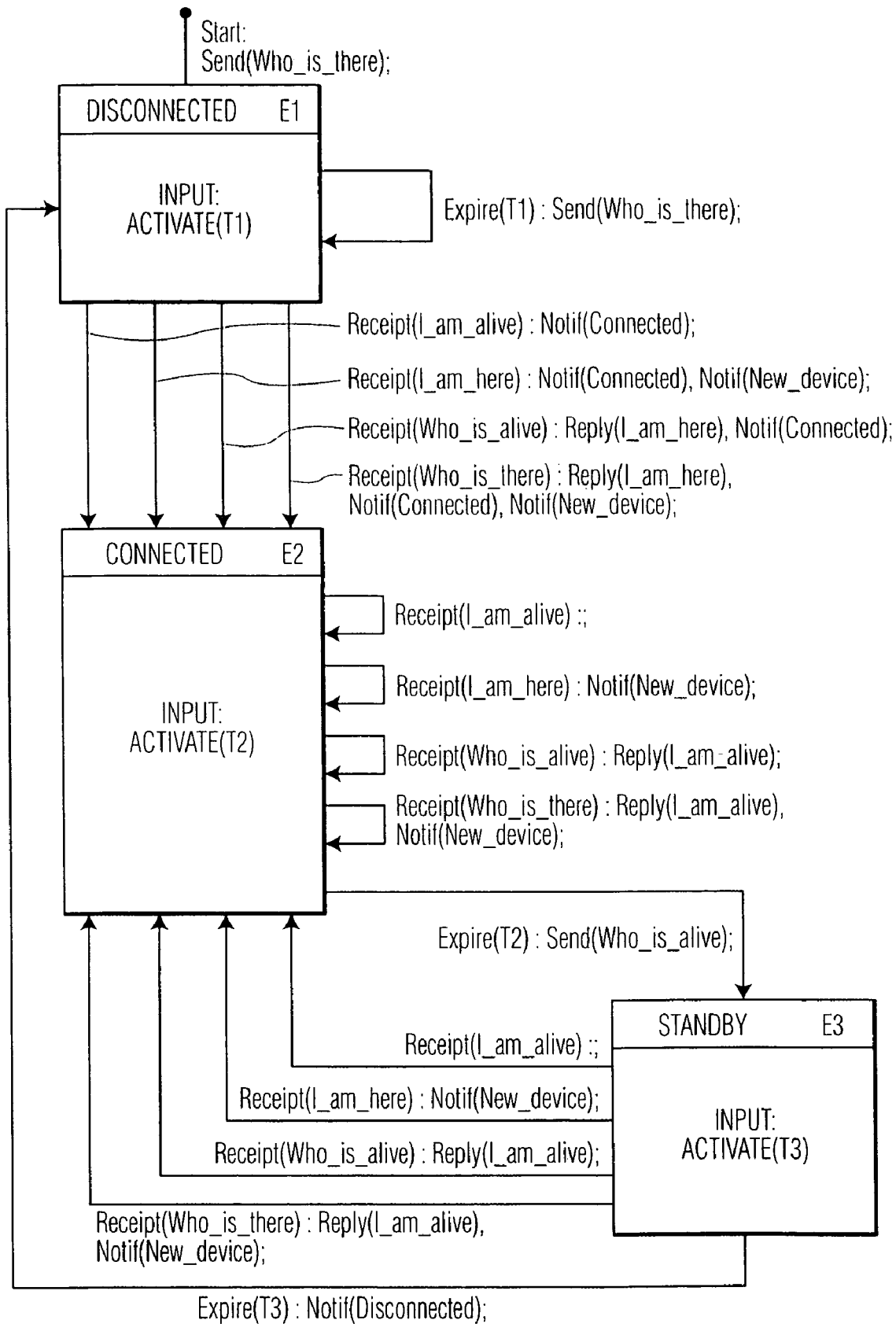
FIG. 1 shows a method in the form of a finite-state automaton.

FIG. 1 describes the finite-state automaton of an embodiment of the invention. When the device starts up, it starts by sending a "Who_is_there" request, referenced as A1, on the network. Through this action, it switches to the disconnected state, referenced as E1. Entry into this state activates a timer T1, the value of which may, for example, be 1 second. This value may be reduced in order to increase the responsiveness of the system in detecting the connection of the device.

In the disconnected state E1, if the timer T1 expires, the device is considered as still disconnected. It therefore resends a "Who_is_there" request and reverts to the state E1, thereby reinitialising the timer T1.

In the disconnected state E1, if the device receives an "I_am_alive" reply from a different device on the network, this message indicates to it that it is connected, whereupon it signals this event, for example through an event manager accessible to the high-level application of the device. The device therefore sends a "Connected" event. It therefore switches to the connected state, referenced as E2. Entry into this state E2 activates a new timer T2, typically in the order of several minutes, at least if there is no need for fast detection of the disconnection of devices from the network.

In the disconnected state E1, if a device receives an "I_am_here" reply from a different device on the network, it responds as in the previous case in which it received an "I_am_alive" message. The only difference between the two replies is that the "I_am_here" reply instead of "I_am_alive" indicates that the device which sent this reply has just connected and that this is its first reply. The arrival of a new device in the network is thereby detected, and this event is signalled by sending a "New_device" event in addition to the "Connected" event.

In the disconnected state E1, if the device receives a "Who_is_here" or "Who_is_alive" request from a different device on the network, this message signals to it that it is connected and that another device is seeking to find out who is on the network. The device then switches to the connected state E2. A "Connected" event is signalled, indicating the connection of the device to the network. The device responds to the request with an "I_am_here" reply, indicating its presence on the network and the fact that this is the first reply which it has sent since being connected. In the event of a "who_is_here" request, a "New_device" event is also signalled, since the device sending the request has just connected to the network.

Entry into the connected state E2 activates a timer T2. If this timer T2 expires with no messages having been received from the network, the device considers itself as potentially disconnected from the network. To confirm this disconnection, it sends a "Who_is_alive" request on the network and switches to standby awaiting a reply, in the standby state E3.

In the connected state E2, on receiving an "I_am_alive" reply, the device switches to the state E2, thereby reinitialising the timer T2.

In the connected state E2, on receiving a "Who_is_alive" request, the device switches to the state E2, thereby reinitialising the timer T2. It also sends an "I_am_alive" reply, indicating its presence on the network.

In the connected state E2, on receiving a "Who_is_there" request, the device switches to the state E2, thereby reinitialising the timer T2. It also sends an "I_am_alive" reply, indicating its presence on the network. It also transmits a "New_device" event, indicating the arrival on the network of the device which sent the request.

In the connected state E2, on receiving an "I_am_here" reply, the device switches to the state E2, thereby reinitialising the timer T2. It also transmits a "New_device" event, indicating the arrival on the network of the device which sent the request.

Entry into the message reception standby state E3 activates a timer T3, typically of the order of several seconds. Since a "Who_is_alive" request has just been sent, this state is a standby state awaiting replies from devices connected to the network. If this counter expires with no reply having been received, the device considers itself to be disconnected from the network. It transmits a "Disconnected" event to indicate this state and switches to the disconnected state E1.

In the standby state E3, on receiving an "I_am_alive" reply indicating the presence of a different device connected to the network, the device switches to the connected state E2.

In the standby state E3, on receiving an "I_am_here" reply indicating the presence of a different device connected to the network, the device switches to the connected state E2. Since the "I_am_here" reply furthermore indicates that the device which transmitted said reply has just connected to the network, the device therefore transmits a "New_device" event indicating the arrival of the new device.

In the standby state E3, on receiving a "Who_is_alive" request indicating the presence of a different device connected to the network, the device switches to the connected state E2. The device also transmits an "I_am_alive" reply to indicate its presence on the network.

In the standby state E3, on receiving a "Who_is_here" request indicating the presence of a different device connected to the network, the device switches to the connected state E2. The device also transmits an "I_am_alive" reply to indicate its presence on the network. It also transmits an "New_device" event, indicating the arrival on the network of the device which sent the request.

Several alternatives are possible for sending requests. A first method involves broadcasting these messages on the network. In this method, the messages transmitted on the network are delivered to all the devices present on the network, regardless of whether or not they are compatible with the method described. Another method involves defining a "multicast" address and a port which is known to all the devices. This may be a parameter common to all the devices on the network, or an address and a port which is well known, defined by the IANA ("Internet Assigned Number Authority"). The latter solution is preferred. Once this address and this port have been defined, all requests will be transmitted on this multicast address, whereby each device carrying out the method must monitor the traffic on this multicast address. In this way, only the devices concerned will receive messages relating to this protocol.

The preferred choice will be to transmit replies in "unicast" mode, directly from the source to the device transmitting the request.

A method for being more tolerant towards losses of requests or replies, which are always possible, involves specifying that a device is considered to be disconnected only if it does not reply to a given number of successive requests. The choice of this number influences the speed of detection of the disconnection of a device from the network, and equally the reliability of this detection. The smaller this number, the faster the detection, but with the risk of declaring a device to be disconnected when its reply has simply been lost. The larger this number, the lower the risk that all the replies transmitted by a device will be lost while the device is still connected, but the time required to detect an actual disconnection will increase accordingly. In practice, the choice of this number will depend on the reliability of the network which is used, and will, for example, be higher, typically 3, for a wireless network, and 1 for a highly reliable wired Ethernet network.

The algorithm can be extended in order to maintain the list of devices connected at a given time.

A simple modification of the algorithm will preferably be chosen which entails not reinitialising the timer T2 in the connected state E2 on receipt of messages. The identifier (for example the IP address) of any device which sends a request or a reply must be added to the list of devices. Regularly, every T2, the device transmits a "Who_Is_Alive" request and switches to the state E3 in order to verify the presence on the network of devices on the list, along with its own disconnection. The absence of a reply from a device within a given time, for example T4, is interpreted as its disconnection from the network. In this case, this device must be deleted from the list. If no device replies at the end of T3, the device is considered to have been disconnected from the network. It then switches to the state E1 and must clear its list of connected devices.

Other variants may be developed by the person skilled in the art, for example in order to optimize network traffic using replies in "multicast" or "broadcast" mode. Conversely, these variants may require other algorithm modifications.

The mechanism as described may have the disadvantage of causing a transmission wave of "Who_is_alive" requests on the network if the time T2 is the same for all devices. In fact, following circulation of the last message on the network, all the devices will send such requests on expiry of T2. One way to resolve this problem is to make a random choice of T2 within a defined range. In this way, only the device with the shortest T2 will send a request which will be received by all the devices in the network, and which will instigate reset of the timers T2 of all the devices.

It is also possible, for example in the event of network overload, that messages will be lost, resulting in switchover to the disconnected state of a device when the device is in fact still connected, but has not received messages during the time T3. To reduce the risk of false detection of the disconnection of a device, transmission of the "Who_is_alive" request may be reiterated several times in the event of no reply before considering the device to be disconnected.

Messages are preferably sent using the "User Datagram Protocol" (UDP). In fact, use of multicast mode entails the use of UDP, and it therefore seems reasonable to generalize its use for any application, regardless of the distribution mode which is used.

As far as message format is concerned, since the source and destination addresses are contained in the IP header of the message, a single byte which codes the message type will suffice to ensure that the method described performs correctly. The message content can obviously be enhanced without exceeding the scope of the invention. One coding example involves the transmission within the message body of a byte with the value 0x0 for "Who_is_there" requests, 0x1 for "I_am_here" replies, 0x2 for "Who_is_alive" requests and 0x3 for "I_am_alive" replies.

Figure 2:
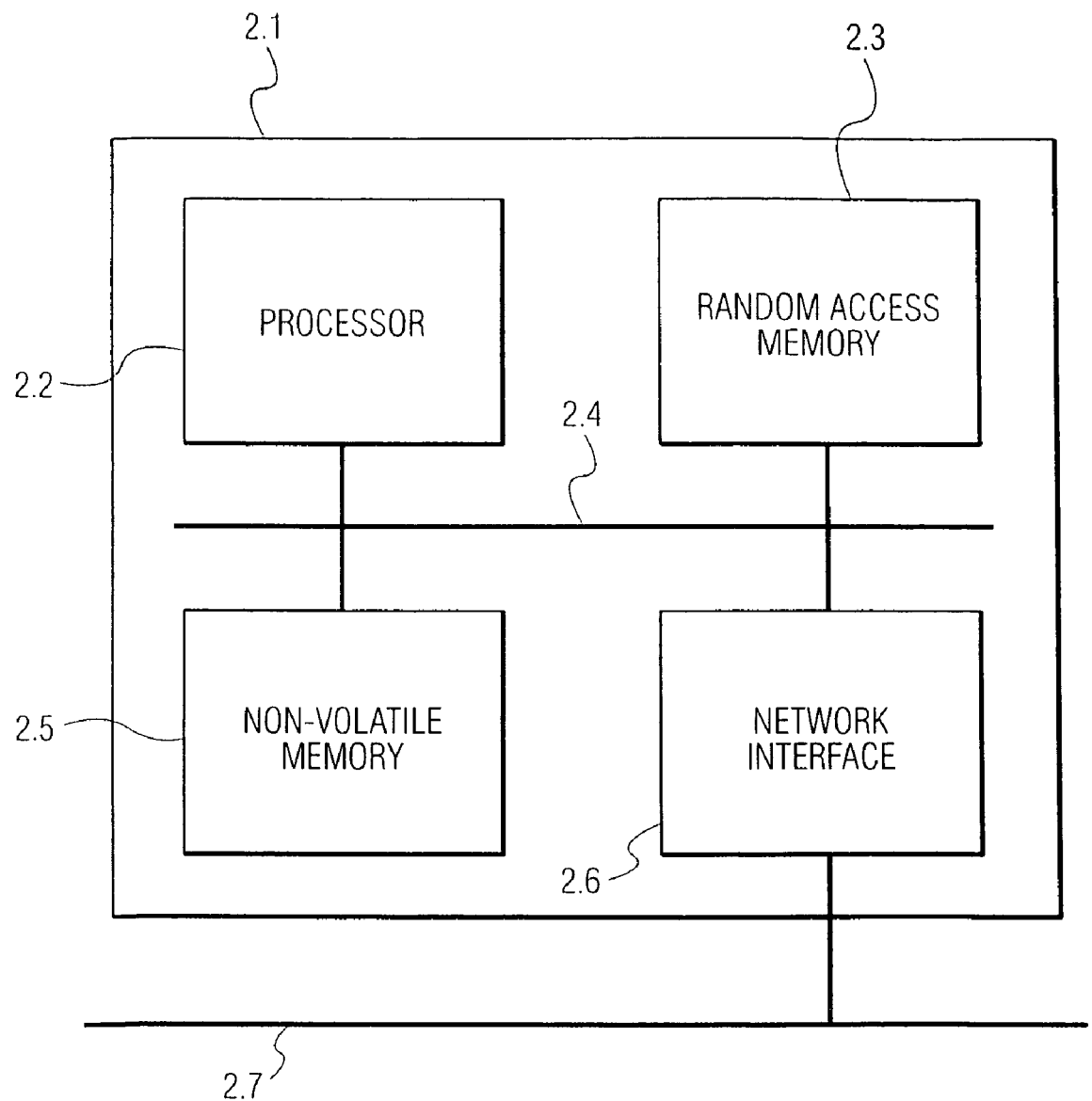
FIG. 2 shows an architecture of a device implementing an aspect of the invention.

FIG. 2 shows an example of the general architecture of a device, referenced as 2.1, which is intended to carry out the method. Such a device comprises a network interface, referenced as 2.6, which is intended to connect the device to the network, referenced as 2.7. It also comprises a non-volatile memory, referenced as 2.5, which is intended to store the programs required in order to carry out the method, including the stack managing the IP communication, the network interface management layer and the programs managing the exchanges of messages according to the method described. These programs will be loaded into the random access memory, referenced as 2.3, to be run by the central processor, referenced as 2.2. All these elements will be interconnected by a communications bus, referenced as 2.4. It will be evident to the person skilled in the art that this architecture may vary in the configuration of these means, and is no more than an example of the architecture of a device which is capable of carrying out the method.

It goes without saying that, although it is described in the context of messages transmitted in multicast mode using UDP, the invention may be varied by the person skilled in the art in terms of the transmission modes and the protocol used, for example TCP ("Transport Control Protocol"), without exceeding the scope of the invention.

What is claimed is:

1. A method, comprising:

discovery, by a first device intended to be connected to an IP network, of a state of connection of said first device to said IP network, said IP network comprising at least one compatible second device, the method comprising the following steps, implemented by said first device:

switchover to a disconnected state, at startup, and sending a request on said P network asking said at least one compatible second device to reply;

in the disconnected state, repeatedly sending of said request on said IP network asking said at least one compatible second device to reply, when no message is received from said at least one compatible device within a first given period of time;

from the disconnected state, switchover to a connected state, on receipt by said first device of at least one message from said at least one compatible second device;

from the connected state switching to a standby state when no message is received from said at least one compatible second device within a second given period of time;

from the standby state, switching to said connected state upon reception of at least one message from said at least one compatible second device within a third given period of time; and from the standby state, switching to said disconnected state when no message is received from said at least one compatible second device within said third given period of time.

2. The method of claim 1, wherein, on receipt of a request originating from said at least one compatible second device, said first device sends a reply on the network.

3. The method of claim 2, wherein said first device, being in a connected state, and not having received a message from said at least one compatible second device within said second period of time, sends a request on the IP network and switches to said message reception standby state.

4. The method of claim 1, wherein said first device sends messages according to the method in a multicast mode to an address and a port known to all devices, and whereby the first device monitors the traffic on this address and on this port.

5. The method of claim 1, wherein the requests sent when said first device is in the disconnected state, referred to as first requests, are different from the requests sent when said first device is in the connected state and whereby the first reply sent after having switched from the disconnected state is different from the following replies.

6. The method of claim 1, wherein said first device signals the arrival of a new device on the network on receiving a first request or a first reply.

7. The method of claim 1, wherein the said first device maintains a list of connected devices.

8. The method of claim 7, wherein said first device compares replies received in response to a request with the list of connected devices in order to remove from the list devices that have not replied.

9. The method of claim 1, wherein said at least one message is a reply message generated in response to said request repeatedly sent by said first device or a request message from said second device.

10. The method of claim 1, wherein said first device, being in said standby state and not having received any messages from said at least one compatible second device, repeats a given number of times and for a given period of time, the sending of a request on said IP network asking said at least one compatible second device to reply, before switching to said disconnected state.

11. A method, comprising:

configuring a first device to a disconnected state upon the first device attempting to connect to a network, the disconnected state indicating a lack of a connection to the network;

sending, from the first device in the disconnected state, at least one automatic request repeatedly through a network;

reconfiguring the first device from the disconnected state to a connected state upon receiving at least one message from a second device connected to the network, the connected state indicating a connection to the network, the second device being distinct from the first device and, the sending of automatic request being stopped when the first device is in the connected state;

sending a reply through the network upon receipt of a request originating from the second device;

sending a request through the network and reconfiguring the first device from the connected state to a message reception standby state upon the first device not receiving a message during a first predetermined time period while the first device is in the connected state;

reconfiguring the first device to the disconnected state upon the first device not receiving a message during a second predetermined time period while the first device is in the message reception standby state;

reconfiguring the first device to the connected state upon the first device receiving a message while in the message reception standby state; and repeating dispatch of the request during the second predetermined time period while the first device is in the message reception standby state before reconfiguring the first device to the disconnected state.

* * * * *